United States Patent
Khramov et al.

(10) Patent No.: US 11,884,871 B2
(45) Date of Patent: Jan. 30, 2024

(54) POLYMERIC RHEOLOGY MODIFIERS

(71) Applicant: Schlumberger Technology Corporation, Sugar Land, TX (US)

(72) Inventors: Dimitri M. Khramov, Katy, TX (US); Yiyan Chen, Sugar Land, TX (US); Stephen Cliffe, Houston, TX (US); Reda Karoum, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/874,575

(22) Filed: May 14, 2020

(65) Prior Publication Data

US 2020/0362221 A1 Nov. 19, 2020

Related U.S. Application Data

(60) Provisional application No. 62/848,295, filed on May 15, 2019.

(51) Int. Cl.
*C09K 8/34* (2006.01)
(52) U.S. Cl.
CPC ..................... *C09K 8/34* (2013.01)
(58) Field of Classification Search
CPC ................... C09K 8/34; C09K 8/32
See application file for complete search history.

(56) References Cited

U.S. PATENT DOCUMENTS 6,159,906 A * 12/2000 McNally .................. C09K 8/32
507/119

OTHER PUBLICATIONS

Recommended Practice of Standard Procedure for Field Testing Water-Based Drilling Fluids, American Petroleum Institute (API) Recommended Practice 13B-1 [ISO 10414-1], 1st ed, Jun. 1, 1980, 60 pages.
Addendum 1 to Standard Procedure for Field Testing oil-based Drilling Fluids, American Petroleum Institute (API) Recommended Practice 13B-2 [ISO 10414-2], 1998, 77 pages.
Rheology and Hydraulics of Oil-well Drilling Fluids. American Petroleum Institute (API) Recommended Parctice 13D, 7th ed., Sep. 2017, 98 pages.

* cited by examiner

*Primary Examiner* — Kumar R Bhushan
(74) *Attorney, Agent, or Firm* — Jeffrey D. Frantz (57) ABSTRACT

Wellbore fluid compositions may include an oleaginous base fluid; and a polymeric rheology modifier incorporating a polar comonomer at a percent by weight (wt %) in the range of 1 wt % to 20 wt %; wherein the low shear rate viscosity (LSRV) of the wellbore fluid measured by FANN 35 rheometer at 3 rpm and 150° F. is in the range of 8 to 12. Methods may include emplacing a wellbore fluid in a wellbore, wherein the wellbore fluid comprises an oleaginous base fluid and a polymeric rheology modifier incorporating a polar comonomer at a percent by weight (wt %) in the range of 1 wt % to 50 wt %; wherein the low shear rate viscosity (LSRV) of the wellbore fluid is in the range of 8 to 12.

6 Claims, 2 Drawing Sheets

FIG. 1

| Num | Temp F | Temp C | Pressure psi | Pressure bar | Fann Degrees at Shear Rate | | | | | | Gel 10 sec | Gel 10 min | PV cp | YP lb/hsf | Ty/YP |
|---|---|---|---|---|---|---|---|---|---|---|---|---|---|---|---|
| | | | | | 600 rpm | 300 rpm | 200 rpm | 100 rpm | 6 rpm | 3 rpm | | | | | |
| 1 | 100 | 38.0 | 0 | 0 | 83 | 42 | 24 | 10 | 1 | 1 | 2 | 14 | 41 | 1 | 0.00 |
| 2 | 100 | 38.0 | 3000 | 204 | 122 | 61 | 34 | 16 | 1 | 1 | 2 | 16 | 61 | 0 | 0.00 |
| 3 | 150 | 66.0 | 0 | 0 | 72 | 37 | 25 | 13 | 3 | 2 | 4 | 12 | 35 | 2 | 0.85 |
| 4 | 150 | 66.0 | 3000 | 204 | 94 | 47 | 32 | 17 | 3 | 2 | 4 | 14 | 47 | 0 | 0.00 |
| 5 | 150 | 66.0 | 5000 | 340 | 111 | 56 | 37 | 21 | 3 | 2 | 4 | 15 | 55 | 1 | 1.00 |
| 6 | 200 | 93.0 | 0 | 0 | 62 | 36 | 26 | 15 | 5 | 3 | 6 | 9 | 26 | 10 | 0.32 |
| 7 | 200 | 93.0 | 3000 | 204 | 75 | 43 | 31 | 18 | 5 | 3 | 6 | 11 | 32 | 11 | 0.26 |
| 8 | 200 | 93.0 | 5000 | 340 | 86 | 49 | 35 | 21 | 5 | 3 | 6 | 12 | 37 | 12 | 0.24 |
| 9 | 200 | 93.0 | 10000 | 680 | 120 | 68 | 47 | 31 | 5 | 4 | 7 | 16 | 52 | 16 | 0.16 |
| 10 | 250 | 121.0 | 3000 | 204 | 69 | 43 | 32 | 19 | 6 | 4 | 7 | 8 | 26 | 17 | 0.24 |
| 11 | 250 | 121.0 | 5000 | 340 | 77 | 47 | 35 | 22 | 6 | 4 | 7 | 9 | 30 | 17 | 0.23 |
| 12 | 250 | 121.0 | 10000 | 680 | 100 | 61 | 45 | 29 | 7 | 4 | 8 | 11 | 39 | 22 | 0.16 |
| 13 | 250 | 121.0 | 15000 | 1020 | 131 | 79 | 57 | 39 | 7 | 5 | 8 | 14 | 52 | 27 | 0.12 |
| 14 | 325 | 163.0 | 5000 | 340 | 77 | 49 | 36 | 23 | 8 | 5 | 4 | 4 | 28 | 21 | 0.19 |
| 15 | 325 | 163.0 | 10000 | 680 | 94 | 59 | 45 | 29 | 8 | 5 | 5 | 6 | 35 | 24 | 0.14 |
| 16 | 325 | 163.0 | 15000 | 1020 | 115 | 72 | 54 | 36 | 8 | 5 | 5 | 7 | 43 | 29 | 0.10 |
| 17 | 325 | 163.0 | 20000 | 1361 | 141 | 88 | 65 | 45 | 8 | 6 | 6 | 9 | 53 | 35 | 0.06 |
| 18 | 375 | 191.0 | 15000 | 1020 | 116 | 73 | 54 | 35 | 8 | 5 | 3 | 4 | 43 | 30 | 0.04 |
| 19 | 375 | 191.0 | 20000 | 1361 | 139 | 87 | 64 | 42 | 8 | 5 | 3 | 5 | 52 | 35 | 0.01 |

FIG. 2

| Num | Temp F | Temp C | Pressure psi | Pressure bar | Fann Degrees at Shear Rate ||||||| Gel 10 sec | Gel 10 min | PV cp | YP lb/hsf | Ty/YP |
| | | | | | 600 rpm | 300 rpm | 200 rpm | 100 rpm | 6 rpm | 3 rpm | | | | | |
|---|---|---|---|---|---|---|---|---|---|---|---|---|---|---|---|
| 1 | 100 | 38.0 | 0 | 0 | 114 | 62 | 44 | 25 | 5 | 4 | 4 | 23 | 52 | 10 | 0.32 |
| 2 | 100 | 38.0 | 3000 | 204 | 157 | 86 | 60 | 32 | 6 | 4 | 5 | 29 | 71 | 15 | 0.20 |
| 3 | 150 | 66.0 | 0 | 0 | 74 | 40 | 29 | 18 | 5 | 4 | 4 | 19 | 34 | 6 | 0.64 |
| 4 | 150 | 66.0 | 3000 | 204 | 91 | 49 | 35 | 21 | 5 | 4 | 5 | 22 | 42 | 7 | 0.55 |
| 5 | 150 | 66.0 | 5000 | 340 | 105 | 57 | 41 | 24 | 6 | 4 | 6 | 25 | 48 | 9 | 0.43 |
| 6 | 200 | 93.0 | 0 | 0 | 61 | 34 | 25 | 17 | 6 | 5 | 5 | 17 | 27 | 7 | 0.69 |
| 7 | 200 | 93.0 | 3000 | 204 | 72 | 39 | 29 | 19 | 6 | 5 | 6 | 20 | 33 | 6 | 0.83 |
| 8 | 200 | 93.0 | 5000 | 340 | 80 | 44 | 32 | 21 | 6 | 5 | 6 | 21 | 36 | 8 | 0.63 |
| 9 | 200 | 93.0 | 10000 | 680 | 104 | 58 | 42 | 26 | 7 | 6 | 8 | 26 | 46 | 12 | 0.43 |
| 10 | 250 | 121.0 | 3000 | 204 | 66 | 37 | 29 | 20 | 8 | 7 | 7 | 19 | 29 | 8 | 0.85 |
| 11 | 250 | 121.0 | 5000 | 340 | 71 | 41 | 31 | 21 | 8 | 7 | 7 | 20 | 30 | 11 | 0.63 |
| 12 | 250 | 121.0 | 10000 | 680 | 88 | 51 | 38 | 25 | 9 | 7 | 9 | 24 | 37 | 14 | 0.50 |
| 13 | 250 | 121.0 | 15000 | 1020 | 109 | 63 | 47 | 30 | 10 | 8 | 11 | 28 | 46 | 17 | 0.42 |
| 14 | 325 | 163.0 | 5000 | 340 | 73 | 44 | 36 | 27 | 13 | 12 | 10 | 20 | 29 | 15 | 0.81 |
| 15 | 325 | 163.0 | 10000 | 680 | 86 | 53 | 42 | 31 | 14 | 13 | 12 | 23 | 33 | 20 | 0.62 |
| 16 | 325 | 163.0 | 15000 | 1020 | 101 | 62 | 49 | 35 | 15 | 13 | 14 | 26 | 39 | 23 | 0.55 |
| 17 | 325 | 163.0 | 20000 | 1361 | 119 | 74 | 57 | 40 | 16 | 14 | 16 | 29 | 45 | 29 | 0.44 |
| 18 | 375 | 191.0 | 15000 | 1020 | 106 | 69 | 56 | 43 | 22 | 20 | 18 | 26 | 37 | 32 | 0.61 |
| 19 | 375 | 191.0 | 20000 | 1361 | 123 | 79 | 64 | 49 | 23 | 21 | 20 | 29 | 44 | 35 | 0.56 |

POLYMERIC RHEOLOGY MODIFIERS

CROSS REFERENCE TO RELATED APPLICATIONS

This application claims the benefit of priority to U.S. Provisional Patent Application 62/848,295, filed on May 15, 2019, the entire content of which is incorporated herein by reference.

BACKGROUND

Wellbore fluid rheology is an important factor in fluid performance and is often monitored and modified over the course of many types of wellbore operations. During drilling operations, for example, fluid rheology is enhanced to improve suspension properties to carry cuttings away from the drill bit, and to form gels that prevent cuttings and/or weighting agents to sag under the force of gravity. At the same time, suspension properties of a wellbore fluid are balanced against excessive viscosity and maintaining a low effective circulation density (ECD). In some formations having narrow fracture gradients, excessive ECD may cause formation fractures and other operational issues. Furthermore, excessive gel strength of an OBM can cause stuck pipe or excessive pressure spikes after pump restart, which can cause equipment and/or formation damage.

Rheology properties are affected by a number of factors such as solids content, oil-brine ratio, and emulsifier type. To provide on-the-fly adjustments, rheology modifiers (RM) such as organoclays such as bentonite, sepiolite, and hectorite are often used. In addition, a number of organic viscosifiers may be added. However, temperature and pressure extremes in the downhole environment may cause added RMs to undergo physical and chemical changes that may cause unpredictable change in fluid viscosity and ECD.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to wellbore fluid compositions that may include an oleaginous base fluid a polymeric rheology modifier incorporating a polar comonomer at a percent by weight (wt %) in the range of 1 wt % to 20 wt %; and wherein the weight average molecular weight of the polymeric rheology modifier is in the range of 1 kDa to 100 kDa.

In one aspect, embodiments disclosed herein relate to methods that may include emplacing a wellbore fluid in a wellbore, wherein the wellbore fluid includes an oleaginous base fluid and a polymeric rheology modifier incorporating a polar comonomer at a percent by weight (wt %) in the range of 1 wt % to 50 wt %; wherein the weight average molecular weight of the polymeric rheology modifier is in the range of 1 kDa to 100 kDa.

Other aspects and advantages of the claimed subject matter will be apparent from the following description and the appended claims.

DETAILED DESCRIPTION

In one aspect, embodiments disclosed herein relate to polymeric rheology modifiers for wellbore fluids. Polymeric rheology modifiers may include tunable polymer systems for use in oil-based wellbore fluids and emulsions that include varied polymer architectures and degrees of substitution with polar moieties. In one or more embodiments, polymeric rheology modifiers may include one or more random, block, and graft copolymers that maintain acceptable performance even under high temperature and high pressure conditions.

Control over rheology is an important component of wellbore fluid formulation, particularly at temperature and pressure extremes encountered in downhole environments. Stability of the wellbore fluid over time is another design consideration, particularly for extended reach wells where the system will spend a long time under static conditions, and deviated wells in which solids settling becomes more challenging as the well deviates from the vertical. The ability to function in various temperature extremes may be another consideration during formulation.

At high temperature, fluids tend to thin out, making rheology modifiers less effective. Additionally, high temperatures may increase rates of degradation for rheology modifiers. At the opposite extreme, subsea applications also introduce the complication of low temperatures and varied temperature zones. For example, fluids introduced into subsea application may experience high and low temperatures depending on zonal depth, whether at elevated temperatures downhole or cold temperatures in the riser leading to the surface. While some of these changes may be counteracted by increasing the concentration of various rheology modifiers, high loading can have negative effects, including excessive viscosity and gel formation as the fluid is exposed to variations and extremes in temperature.

In one or more embodiments, polymeric rheology modifiers may be used to formulate wellbore fluids that exhibit enhanced rheology by stabilizing the interface between insoluble phases and/or interacting with clays or other solids, which results in fluid formulations that are stable over time even when exposed to temperature extremes. In some embodiments, wellbore fluid formulations may exhibit no or limited change in rheological properties at low temperatures (40° F., for example) and to elevated temperatures (up to 375° F., for example) under static and dynamic conditions. Polymeric rheology modifiers in accordance with the present disclosure may be formulated into a variety of wellbore fluids, including oil-based fluids and invert emulsions.

In one or more embodiments, polymeric rheology modifiers may include copolymers having a tunable degree of polar functionality by controlling the ratio of polar comonomers introduced into the polymer structure, and by controlling the molecular weight to avoid excess low temperature rheology and maintain acceptable solubility in the fluid. Polymers composed of nonpolar monomers tend to remain in the oleaginous phase of a multiphase emulsion. By introducing polar functionality, polymer rheology modifiers may interact with clays, solids, and emulsion droplets through the polar groups appended to the polymer backbone, increasing internal phase dispersion, fluid stability, and gel strength.

While not limited to a particular theory, the ratio of polar comonomers to nonpolar comonomers may be used to tune the stability of a modified wellbore fluid, where polar residues within the rheology modifier interact with aqueous phases and charged solids, while nonpolar residues interact with oleaginous phases and hydrophobic solids. The combined interactions of the constituent comonomers of the polymeric rheology modifier build the rheology of the wellbore fluid, while the polymer backbone provides chemical stability and resistance to degradation over time.

In one or more embodiments, polymeric rheology modifiers may include linear structures with polar functionalized side chains and may also include branched structures having one or more branches extending from a backbone polymer or nucleus. Polymeric rheology modifiers may include random and block copolymers prepared from a mixture of nonpolar and polar comonomers in some embodiments, and may include graft polymers prepared by appending polar comonomers to a nonpolar backbone polymer or nucleus in other embodiments. Rheology modifiers in accordance with the present disclosure may be formulated in oil-based wellbore fluids and invert emulsions and used in high temperatures and/or high pressure applications.

Polymeric Rheology Modifiers

In one or more embodiments, polymeric rheology modifiers may include low to moderate molecular weight polymers having a ratio of hydrophobic and hydrophilic moieties. In some embodiments, nonpolar comonomers may be used to construct a polymer backbone that may control the overall oil solubility of polymeric rheology modifier. The backbone polymer of a polymeric rheology modifier may be a linear polymer structure or may possess an irregular or branching structure in some embodiments. In embodiments directed to branching and irregular structures, the degree of branching may be used to control the solubility of the rheology modifier at low temperatures, by modifying the crystallization properties at low temperatures.

In one or more embodiments, polymeric rheology modifiers in accordance with the present disclosure may include polymeric structures prepared through covalent bonds such as carbon-carbon bonds, amides, ethers, thioethers, and the like. In some embodiments, polymeric rheology modifiers may eliminate or minimize the presence of hydrolytically labile groups that may limit stability in some high temperature applications, such as esters, amine salts, anhydrides, phosphate esters, sulfate esters, and the like. Polymeric rheology modifiers in accordance with the present disclosure may be prepared by any suitable polymerization method including bulk polymerization, solution polymerization, emulsion polymerization, suspension polymerization, and grafting.

In one or more embodiments, polymeric rheology modifiers may be random and block copolymers that include one or more polar comonomers having one or more polar groups selected from hydroxyl, carboxylic, amino, amido, and aryl and/or phenyl groups having polar substituents such as hydroxyl and sulfonyl groups, and the like. In some embodiments, polymeric rheology modifiers may be a random or block copolymer having the general formula (I):

$$[A][B][C] \qquad (I)$$

where A is a nonpolar comonomer present at a percent by weight (wt %) in the range of 50 wt % to 99 wt %. B is a polar comonomer present at a wt % of the copolymer in a range having a lower limit selected from 1 wt %, 5 wt %, and 10 wt %, to an upper limit selected from 10 wt %, 20 wt %, and 50 wt %, where any lower limit may be combined with any upper limit. C is a comonomer that may be polar or nonpolar and, if present, may be present at a wt % of the copolymer in a range of 0 wt % to 49 wt %.

Nonpolar comonomers used to prepare polymeric rheology modifiers in accordance with the present disclosure may include saturated and unsaturated, aromatic and nonaromatic, C2-C30 comonomers such as olefins, alpha olefins, internal olefins, aromatics such as styrene, vinyl toluene, vinyl xylene, vinyl naphthalene, and the like, natural feedstocks such as epoxy functionalized vegetable oils, ethylene oxide, propylene oxide, and the like. In one or more embodiments, the concentration of nonpolar comonomers may be used to modify the solubility of a polymeric rheology modifier at lower temperatures, which may also reduce undesirable high shear rate viscosity.

Polar comonomers in accordance with the present disclosure may include monomers having one or more polar functional groups such as carboxylic acids, anhydrides, sulfonyl groups, phosphoryl groups, hydroxyl groups, amines, and the like. In some embodiments, polar comonomers may include monomers having one or more carboxylic acid and/or anhydrides such as acrylic acid, methacrylic acid, maleic anhydride, itaconic anhydride, citaconic anhydride, methyl glutamic anhydride, fumaric acid, 2-propene 1,2-dicarboxylic acid, maleic acid, undecenoic acid, and the like; unsaturated alcohols such as allyl alcohol; ureido-substituted monomers such as ureido methacrylate; vinyl esters such as vinyl versatate, isobutyl methacrylate, and the like; vinyl pyrrolidones; vinyl pyridines; sulfonated aromatics such as sulfonated styrene and sulfonated 4-vinylpyridine; ethoxylates; and the like. Further, it is understood that for both the nonpolar comonomers and the polar comonomers, it is envisioned that any combination of polar and nonpolar comonomers may exist and that the copolymers of the present disclosure may include one or more of each of the polar comonomers and nonpolar comonomers.

Polymeric rheology modifiers may include polyblock copolymers such as copolymers including poly(styrene-co-acrylic acid), poly(ethylene-co-acrylic acid), poly(styrene-co-vinyl alcohol), poly(styrene-ureido methacrylate), poly(styrene-co-allyl alcohol), poly(styrene-vinyl versatate), poly(1-vinylpyrrolidone-co-styrene), poly(styrene-co-methyl methacrylate), poly(4-vinylpyridine-co-styrene), poly(2-vinylpyridine-co-styrene), poly(isobutyl methacrylate), poly(isobutyl methacrylate-co-styrene), poly(ethylene-co-vinyl alcohol), sulfonated copolymers such as sulfonated polystyrene-poly(4-vinylpyridine) copolymers, and poly(styrene-co-styrene sulfonate), including lightly sulfonated polymers having low ratios of styrene sulfonate, and triblock copolymers that encompass polystyrene-block-poly(2-vinylpyridine)-block-poly(iso-butyl methacrylate), combinations of any of the above, and the like.

In one or more embodiments, polymeric rheology modifiers may include graft copolymers and comb- or brush-like polymers in which reactive sites on a backbone polymer, oligomer, or nucleus are reacted with one or more graft comonomers to modify solubility and molecular weight. In some embodiments, graft polymers may include a polymer backbone prepared from polar and/or nonpolar monomers and comonomers, where the polymer backbone has one or more reactive sites that include carboxylic acids, amines, unsaturated carbon bonds, hydroxyls, and the like, reacted with one or more graft comonomers to produce branched and brush structures. For example, graft copolymers may be prepared by forming amide bonds by reacting carboxylic acid groups on the backbone polymer with alkyl amines, or, conversely reacting amines on the backbone polymer with carboxylic acids.

In one or more embodiments, polymeric rheology modifiers may be graft copolymers having the general formula (II)

$$([A][C])\text{-}[B] \quad (II)$$

where ([A][C]) is a backbone polymer or nucleus having one or more reactive sites that may react with graft comonomer B. Comonomer A is a nonpolar monomer at a percent by weight (wt %) in the range of 50 wt % to 99 wt % of the graft copolymer, comonomer C may be polar or nonpolar and may be present at a wt % ranging from a 0 wt % to 49 wt % of the graft copolymer, with the proviso that at least one of A and C have functional groups reactive to graft comonomer B. B is a graft comonomer appended onto the backbone polymer or nucleus ([A][C]), where B is present at a wt % of the graft copolymer in a range having a lower limit selected from 1 wt %, 5 wt %, and 10 wt %, to an upper limit selected from 10 wt %, 20 wt %, and 50 wt %, where any lower limit may be combined with any upper limit.

In one or more embodiments, the polymer architecture of graft polymers having general formula (II) may be adjusted by increasing or decreasing the concentration of the backbone comonomer A or C and modifying the number of reactive sites available during subsequent grafting reactions. For example, the ratio of styrene to maleic anhydride in a backbone copolymer can be adjusted to modify the polymer architecture by limiting or increasing the number of branching sites for reaction with grafting comonomers.

In one or more embodiments, backbone polymers used to generate graft copolymers may include multireactive species such as polyamines and polyacids. As used herein, "polyamine" refers to a compound having two or more amine functional groups, including polymers and oligomers substituted with primary or secondary amines. The amine functional groups may be pendant groups off of a backbone polymer or nucleus in some embodiments, or may be heteroatoms within a carbon chain in other embodiments. Polyamine polymers may include polymers and copolymers prepared from amine functionalized monomers such as vinyl amine, ethylene imine, and the like.

In one or more embodiments, polyamines may include small molecule nuclei and oligomer polyamines including diethanolamine, triethanolamine, diethylenetriamine (DETA), triethylenetetramine (TETA), tetraethylenepentamine (TEPA), pentaethylenehexamine (PEHA), and other polyethylene polyamines. Polyamines may include linear or branched organophilic C6-C36 fatty polyamines including alkyl diamines, polyether diamine, polyaliphatic polyamines, heterocyclic polyamines, alkylalkanol polyamines, polyethertriamines or polyethyleneimine.

Other multireactive species in accordance with the present disclosure may include polyacids in some embodiments. As used herein, "polyacid" refers to a compound having two or more carboxylic acid functional groups available to react with additional compounds. The carboxylic acid functional groups may be pendant groups off of a backbone polymer or nucleus in some embodiments, or on carbon chains branching off of the backbone polymer in some embodiments. Polyacid polymers may include polymers and copolymers prepared from carboxylic acid functionalized monomers such as acrylates, methacrylates, and maleic acids.

In one or more embodiments, polyacids may include may include small molecule and oligomer polyacids including linear and branched, saturated and unsaturated C6-C36 fatty polyacids such as oxalic acid, malonic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, citric acid, maleic acid, fumaric acid, and the like.

Polyamines and polyacids in accordance with the present disclosure may be reacted with one or more fatty reactants to produce graft copolymers in accordance with the present disclosure. Fatty reactants in accordance with the present disclosure may include species having the general formula of X—R, where X is a functional group selected from primary and secondary amines, alcohols, thiols, sulfinic acids, sulfonic acids, and carboxylic acids; and R is a saturated and unsaturated, branched and linear, carbon chain having at a carbon number of C2-C30. In some embodiments, the fatty reactant may be one or more fatty acids, including C2-C30 fatty acids such as lauric acid, myristic acid, palmitic acid, stearic acid, oleic acid, or linoleic acid; C2-C30 alkenyl acids, C2-C30 arylalkyl acids, and C2-C30 cycloalkyl acid. In some embodiments, the fatty reactant may include saturated and unsaturated, branched and linear, fatty amines such as a C2-30 alkyl amine, C2-C30 alkenyl amine, C2-C30 arylalkyl amine, and C2-C30 cycloalkyl amine, including oleylamine, tallow amines, coco amines, hexadecyl amine, tetradecyl amine, and the like.

In one or more embodiments, graft copolymers may include polyacid functionalized backbone polymers that are reacted with amines to produce emulsifiers and rheology modifiers. For example, graft copolymers may include polyacid homopolymers or copolymers reacted with C2-C30 saturated and unsaturated amines. In some embodiments, polyacid backbone polymers may be reacted with linear or branched C2-C30 fatty polyamines including alkyl diamines, polyether diamine, polyaliphatic polyamines, heterocyclic polyamines, alkylalkanol polyamines, polyethertriamines or polyethyleneimine, non-limiting examples of which may include maleic anhydride homopolymers or copolymers grafted with fatty amines, and styrene methacrylate-graft-polyethyleneimine.

In some embodiments, graft copolymers in accordance with the present disclosure may also include graft copolymers generated by ether-forming reactions to produce dimer alcohol ethoxylates, polyether polyols, and the like. For example, backbone polymer or nucleus ([A][C]) in general formula (II) may have one or more hydroxyl groups that are reacted with a graft comonomer to generate a graft copolymer having one or more ether bonds. Graft copolymers may also include polyamides generated from the reaction of monoamines and polyamines such as ethylenediamine, propylenetriamine, hexamethylenediamine, dimerized primary amines, and other similar diamines, reacted with fatty acids, dimer acids, and trimer acids, and the like.

Graft copolymers in accordance with the present disclosure may include commercially available polyamides of different molecular weight such as SA-540-44, Uni-rez™ series of products including Uni-rez™ 110, Uni-rez™ 2940, Uni-rez™ 106/1, Uni-rez™ 2228, and Uni-rez™ 2291, all of which are produced by the Kraton Corporation.

In one more embodiments, the ratio of backbone polymer to graft comonomers varied to adjust solubility and melting point of the resulting graft polymer and to control the degree of crosslinking. For example, for graft copolymers prepared from poly(styrene-co-maleic anhydride) and graft comonomer polyethylene imine may be combined at a molar excess of polyethylene imine to avoid a possible cross-linking side reaction. In some embodiments, the molar ratio of backbone polymer ($[A]_X[C]_Y$) in general formula (II) to graft comonomer may be in the range of 100:1 to 1:1.

In one or more embodiments, sequential reactions may be used to react multiple graft comonomers with a backbone polymer or nucleus. In some embodiments, graft copolymers may be prepared by reacting a backbone polymer with a first graft comonomer, followed by additional reactions with one or more secondary graft comonomers that react with reactive sites present on the first graft comonomer. For example, a graft copolymer may be prepared by reacting a maleic anhydride homopolymer with a polyethyleneimine in a first reaction, followed by a subsequent reaction with a fatty acid that introduces additional branching from of the polyethyleneimine adducts.

In one or more embodiments, polymeric rheology modifiers in accordance with the present disclosure may exhibit a number average molecular weight in a range having a lower limit selected from 1 kDa, 5 kDa, and 15 kDa, to an upper limit selected from 25 kDa, 50 kDa, and 100 kDa, where any lower limit may be combined with any upper limit. While a number of ranges are provided for polymeric rheology modifiers in accordance with the present disclosure, molecular weights may be more or less depending on the particular application, temperatures encountered, and viscosity ranges desired.

In one or more embodiments, polymeric rheology modifiers may include blends of copolymers having the same or different levels of polar comonomer substitution. polymer blends including sulfonated polystyrene and polystyrene-poly(4-vinylpyridine) polymer blends.

Base Fluid

Wellbore fluids in accordance with the present disclosure may be prepared as an oil-based fluid or invert emulsion having a discontinuous aqueous phase within a continuous oleaginous phase. Base fluids may include oleaginous or oil-based fluids that may be natural oils such as diesel oil or mineral oil, synthetic oils such as hydrogenated and unhydrogenated olefins including polyalpha olefins, linear and branch olefins and the like, polydiorganosiloxanes, siloxanes, or organosiloxanes, esters of fatty acids including straight chain, branched, and cyclical alkyl ethers of fatty acids, mixtures thereof and similar compounds known to one of skill in the art.

Aqueous fluids used to prepare invert emulsions in accordance with the present disclosure may include fresh water, sea water, brine, mixtures of water and water-soluble organic compounds, and mixtures thereof. In various embodiments, the aqueous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts.

In one or more embodiments, the oil:water ratio of an invert emulsion formulation may fall within the range of 30:70 to 95:5 in some embodiments, from 40:60 to 95:5 in some embodiments, from 50:50 to 70:30 in some embodiments, or from 60:40 to 80:20 in yet other embodiments.

The method used in preparing wellbore fluids described herein is not critical. Conventional methods can be used to prepare the wellbore fluids in a manner analogous to those normally used to prepare conventional wellbore fluids. In one representative procedure, a desired quantity of oleaginous fluid such as a base oil and a suitable amount of non-oleaginous fluid may be combined and the remaining components and additives may be added together or sequentially with continuous mixing. Wellbore fluids of the present disclosure is formed by vigorously agitating, mixing or shearing the oleaginous fluid and the non-oleaginous fluid.

Wellbore fluids in accordance with the present disclosure may be formulated to maintain acceptable low shear rate viscosity (LSRV) over time, particularly at downhole temperatures. Shear rate viscosity and wellbore fluid rheology may be determined in accordance with API Recommended Practice 13D. Operating procedures for several concentric-cylinder viscometers are detailed in API Recommended Practice 13B-1/ISO 10414-1 or API Recommended Practice 13B-2/ISO-10414-2. In one or more embodiments, the LSRV of wellbore fluids in accordance with the present disclosure measured by FANN 35 rheometer at 3 rpm and 150° F. is in a range having an lower limit selected from any of 7, 8, and 9, to an upper limit selected from any of to 11, 12, and 13, where any lower limit may be combined with any upper limit.

EXAMPLES

The following examples are merely illustrative, and should not be interpreted as limiting the scope of the present disclosure.

Example 1

In this example, commercially available rheology modifiers are assayed to characterize their performance in an oil-based wellbore fluid at various operating temperatures. Samples containing Thixatrol™ RM-14 or a dimer acid were studied in comparison to a control formulation with no added modifier as shown in Table 1.

TABLE 1

Compositions for Example 1

| Sample | 1<br>No rheology<br>modifier | 2<br>Thixatrol<br>RM-14 | 3<br>Dimer<br>Acid |
| --- | --- | --- | --- |
| Synthetic B | 152 | 152 | 152 |
| Organogel, g | 3 | 3 | 3 |
| lime, g | 5 | 5 | 5 |
| Thixatrol RM-14 | 0 | 2 | 0 |
| Dimer acid | 0 | 0 | 2 |
| Emulsifier (actives), g | 6.25 | 6.25 | 6.25 |
| Surewet, g | 2 | 2 | 2 |
| Ecotrol HT, g | 3 | 3 | 3 |
| 25% $CaCl_2$ | 65 | 65 | 65 |
| M-I Wate | 410 | 410 | 410 |

Following formulation, samples were hot rolled (HR) at 350° F. and tested in a Fann 35 viscometer. The generated output is shown in Table 2. Samples treated with rheology modifier exhibited 600 RPM readings below 300 at low temperature and higher viscometer readings at low RPM when compared to the control sample without rheology modifier. Further, 10 minute gel values are higher with rheology modifiers than without.

TABLE 2

Rheological data for Example 1

| | Sample | | | | | | | | | | | |
|---|---|---|---|---|---|---|---|---|---|---|---|---|
| | 1 | | | | 2 | | | | 3 | | | |
| | Before HR | After HR | | | Before HR | After HR | | | Before HR | After HR | | |
| RPM | 150° F. | 40° F. | 100° F. | 150° F. | 150° F. | 40° F. | 100° F. | 150° F. | 150° F. | 40° F. | 100° F. | 150° F. |
| 600 | 61 | 172 | 84 | 47 | 61 | 183 | 87 | 59 | 92 | 250 | 108 | 62 |
| 300 | 33 | 92 | 43 | 26 | 36 | 100 | 49 | 34 | 59 | 137 | 56 | 32 |
| 200 | 24 | 63 | 30 | 17 | 27 | 71 | 34 | 23 | 46 | 97 | 40 | 22 |
| 100 | 15 | 34 | 16 | 10 | 17 | 40 | 20 | 15 | 34 | 54 | 21 | 112 |
| 6 | 4 | 4 | 3 | 2 | 6 | 6 | 5 | 6 | 16 | 6 | 3 | 3 |
| 3 | 4 | 3 | 2 | 2 | 6 | 5 | 4 | 6 | 16 | 4 | 2 | 2 |
| PV | 28 | 80 | 41 | 21 | 25 | 83 | 38 | 25 | 33 | 113 | 52 | 30 |
| YP | 5 | 12 | 2 | 5 | 11 | 17 | 11 | 9 | 26 | 24 | 4 | 2 |
| 10 second gel | 5 | 4 | 3 | 2 | 10 | 6 | 8 | 11 | 20 | 5 | 4 | 3 |
| 10 minute gel | 6 | 4 | 3 | 2 | 16 | 15 | 20 | 17 | 27 | 15 | 13 | 10 |
| Electrical Stability | 400 | — | — | 250 | 450 | — | — | 600 | 1300 | — | — | 500 |

Example 2

In the next example, the effect of heat aging on the rheological properties of an oil-based wellbore fluid was studied for formulations containing same amount of added rheology modifier Thixatrol™ RM-14 as shown in Table 3. Samples formulated with Thixatrol™ exhibited desirable viscosity at 6 and 3 RPM, and generated gels without causing undesirable high values in high shear rates of 600 and 300 RPM. However, the issue with existing RMs such as Thixatrol™ RM-14 becomes more apparent when the sample is aged for 16 hours. However, with prolonged aging performance appears to degrade as indicated in the drop of low shear rate viscosity (6 and 3 RPM) and gel strengths.

TABLE 3

Sample formulations for Example 2

| Sample | 4 | 5 | 6 |
|---|---|---|---|
| Synthetic B | 152 | 152 | 152 |
| Versagel HT | 3 | 3 | 3 |

TABLE 3-continued

Sample formulations for Example 2

| Sample | 4 | 5 | 6 |
|---|---|---|---|
| lime, g | 5 | 5 | 5 |
| Thixatrol RM-14 | 2 | 2 | 2 |
| Durogel, g | 4 | 4 | 4 |
| Emulsifier (Actives), g | 6.25 | 6.25 | 6.25 |
| Surewet, g | 1 | 1 | 1 |
| Ecotrol HT, g | 3 | 3 | 3 |
| 25% CaCl$_2$ Brine, g | 65 | 65 | 65 |
| M-I Wate, g | 410 | 410 | 410 |

Rheological data is shown in Table 4, which highlights the change in low shear rate viscosity and gels over time as the mud formulations are aged at 350° F.

TABLE 4

Rheological data for Example 2

| | Sample | | | | | | | | | | | |
|---|---|---|---|---|---|---|---|---|---|---|---|---|
| | 4 | | | | 5 | | | | 6 | | | |
| | Conditions | | | | | | | | | | | |
| | Control | | | | 24 hour hot roll | | | | 3 days static | | | |
| RPM | 150° F. | 40° F. | 100° F. | 150° F. | 150° F. | 40° F. | 100° F. | 150° F. | 150° F. | 40° F. | 100° F. | 150° F. |
| 600 | 122 | 252 | 145 | 104 | 122 | 282 | 150 | 106 | 121 | 244 | 116 | 83 |
| 300 | 77 | 145 | 84 | 62 | 83 | 163 | 86 | 63 | 82 | 132 | 59 | 42 |
| 200 | 59 | 105 | 61 | 45 | 65 | 119 | 62 | 44 | 65 | 91 | 38 | 26 |
| 100 | 41 | 61 | 37 | 28 | 44 | 68 | 34 | 26 | 46 | 47 | 20 | 14 |
| 6 | 14 | 11 | 10 | 11 | 17 | 9 | 7 | 8 | 17 | 3 | 2 | 1 |
| 3 | 14 | 8 | 9 | 11 | 15 | 7 | 6 | 7 | 16 | 2 | 1 | 1 |
| PV | 45 | 107 | 61 | 42 | 39 | 119 | 64 | 43 | 39 | 112 | 57 | 41 |
| YP | 32 | 38 | 23 | 20 | 44 | 44 | 22 | 20 | 43 | 20 | 2 | 1 |

TABLE 4-continued

Rheological data for Example 2

| | Sample | | | | | | | | | | | |
|---|---|---|---|---|---|---|---|---|---|---|---|---|
| | 4 | | | | 5 | | | | 6 | | | |
| | | | | | Conditions | | | | | | | |
| | Control | | | | 24 hour hot roll | | | | 3 days static | | | |
| RPM | 150° F. | 40° F. | 100° F. | 150° F. | 150° F. | 40° F. | 100° F. | 150° F. | 150° F. | 40° F. | 100° F. | 150° F. |
| 10 second gel | 13 | 11 | 13 | 18 | 16 | 7 | 8 | 12 | 16 | 3 | 1 | 1 |
| 10 minute gel | 22 | 34 | 44 | 29 | 27 | 24 | 24 | 26 | 23 | 12 | 14 | 16 |
| Electrical Stability | — | — | — | 700 | 533 | — | — | 715 | 379 | — | — | 549 |
| HTHP at 350° F. | — | — | — | 6.2 | — | — | — | 10.6 | — | — | — | 15.0 |
| Water | — | — | — | trace | — | — | — | 0 | — | — | — | 0.1 |
| VSST at 150° F., diff | — | — | — | 0.71 | — | — | — | 1.92 | — | — | — | 3.92 |

Example 3

In the next example, a wellbore fluid is formulated from a polyamide rheological modifier SA-540-44 from Kraton Corporation, which is a polyamide in accordance with the present disclosure based on a dimer acid. The polyamide is regarded as an unreactive polyamide having a low amine value and acid number that limits undesirable changes in pH and viscosity.

While acid number may be beneficial (dimer acid itself can be an RM), the amine number may be minimized because it has undesirable properties in a fluid such as large change in properties before hot roll and after hot roll, and excessive shale dispersion. Samples were formulated as shown in Table 5.

TABLE 5

Sample formulations for Example 3

| Sample | 7 Control | 8 SA-540-44 |
|---|---|---|
| Synthetic B | 152 | 152 |
| Organogel, g | 3 | 3 |
| lime, g | 5 | 5 |
| SA-540-44 | 0 | 0.5 |
| emulsifier (actives), g | 6 | 6 |
| Surewet, g | 1 | 1 |
| Ecotrol HT, g | 3 | 3 |
| 25% CaCl$_2$ | 65 | 65 |
| M-I Wate | 410 | 410 |

From the rheological data in Table 6, it is noted that 0.5 ppb of the rheological modifier improves low shear rate viscosity and gel strength when compared to a system without a rheology modifier, particularly as temperature increases. Also of particular interest is substantial improvement in electric stability (ES).

TABLE 6

Rheological data for Example 3

| | Sample | | | | | |
|---|---|---|---|---|---|---|
| | 7 Control After HR | | | 8 SA-540-44 After HR | | |
| RPM | 40° F. | 100° F. | 150° F. | 40° F. | 100° F. | 150° F. |
| 600 | 223 | 102 | 67 | 238 | 110 | 76 |
| 300 | 127 | 55 | 34 | 134 | 62 | 43 |
| 200 | 92 | 40 | 24 | 97 | 45 | 32 |
| 100 | 54 | 23 | 14 | 55 | 27 | 20 |
| 6 | 10 | 5 | 3 | 9 | 7 | 7 |
| 3 | 8 | 4 | 2 | 8 | 7 | 7 |
| PV | 96 | 47 | 33 | 104 | 48 | 33 |
| YP | 31 | 8 | 1 | 30 | 14 | 10 |
| 10 second gel | 9 | 6 | 4 | 10 | 11 | 12 |
| 10 minute gel | 14 | 8 | 6 | 25 | 24 | 21 |
| Electrical Stability | — | — | 492 | — | — | 1059 |

Example 4

In this next example, dosages of SA-540-44 were varied from 0.5 ppb to 3 ppb. Samples were formulated as shown in Table 7.

TABLE 7

Sample formulations for Example 4

| Sample | 9 | 10 | 11 |
|---|---|---|---|
| Synthetic B | 152 | 152 | 152 |
| ORGANOGEL, g | 3 | 3 | 3 |
| LIME, g | 5 | 5 | 5 |
| SA-540-44 | 0.5 | 1 | 3 |
| Emulsifier (actives), g | 6 | 6 | 6 |
| Surewet, g | 1 | 1 | 1 |
| Ecotrol, HT g | 3 | 3 | 3 |
| 25% CaCl2 Brine, g | 65 | 65 | 65 |
| M-I Wate, g | 410 | 410 | 410 |

The effect of rheology modification appears relatively consistent over a 10-fold range for this product as shown in the rheological data in Table 8.

TABLE 8

Rheological data for Example 4

| | Sample | | | | | | | | |
|---|---|---|---|---|---|---|---|---|---|
| | 9 After HR | | | 10 After HR | | | 11 After HR | | |
| Temperature | 40° F. | 100° F. | 150° F. | 40° F. | 100° F. | 150° F. | 40° F. | 100° F. | 150° F. |
| 600 | 238 | 110 | 76 | 236 | 106 | 72 | 253 | 104 | 68 |
| 300 | 134 | 62 | 43 | 130 | 59 | 41 | 138 | 55 | 37 |
| 200 | 97 | 45 | 32 | 92 | 43 | 30 | 96 | 39 | 27 |
| 100 | 55 | 27 | 20 | 51 | 25 | 19 | 51 | 22 | 16 |
| 6 | 9 | 7 | 7 | 8 | 7 | 8 | 6 | 5 | 7 |
| 3 | 8 | 7 | 7 | 6 | 6 | 7 | 4 | 4 | 6 |
| PV | 104 | 48 | 33 | 106 | 47 | 31 | 115 | 49 | 31 |
| YP | 30 | 14 | 10 | 24 | 12 | 10 | 23 | 6 | 6 |
| 10" Gels | 10 | 11 | 12 | 7 | 11 | 13 | 5 | 9 | 12 |
| 10' Gels | 25 | 24 | 21 | 24 | 24 | 22 | 16 | 19 | 16 |
| Electrical Stability | — | — | 1059 | — | — | 1065 | — | — | 1433 |

Example 5

In this example, the ability of polyamide SA-540-44 to maintain its rheological effect after extended time at high temperature was also assayed. A sample formulated with polyamide SA-540-44 as shown in Table 9 was aged for 3 days at 325° F. and rheology was measured as shown in Table 10.

TABLE 9

Sample formulations for Example 5

| Sample | 12 |
|---|---|
| Synthetic B | 152 |
| ORGANOGEL, g | 4.5 |
| LIME, g | 5 |
| SA-540-44 | 1.5 |
| Emulsifier (actives), g | 6 |
| Surewet, g | 1 |
| Ecotrol, HT g | 3 |
| 25% CaCl2 Brine, g | 65 |
| M-I Wate, g | 410 |

TABLE 10

Rheological data for Example 5

| | 12 | | | | |
|---|---|---|---|---|---|
| Sample | Before HR | After 16 h HR | | | After additional 3 days static aging |
| Temperature | 150 F. | 40 F. | 100 F. | 150 F. | 150 F. |
| 600 | 111 | >300 | 143 | 94 | 110 |
| 300 | 71 | 185 | 82 | 56 | 63 |
| 200 | 53 | 132 | 60 | 41 | 46 |
| 100 | 34 | 75 | 35 | 26 | 28 |
| 6 | 10 | 11 | 9 | 11 | 9 |
| 3 | 8 | 8 | 8 | 11 | 9 |
| PV | 40 | — | 61 | 38 | 47 |
| YP | 31 | — | 21 | 18 | 16 |
| 10" Gels | 8 | 11 | 11 | 18 | 11 |
| 10" Gels | 23 | 41 | 35 | 28 | 29 |
| Electrical Stability | 710 | — | — | 1798 | 1376 |

Comparing data for the samples formulated with Thixatrol™ as shown in Table 11, the rheological properties in Table 12 show that that polyamide SA-540-44 maintains its low shear rate viscosity (LSRV) and ability to produce gels, while muds with Thixatrol™ loses LSRV and gel performance.

TABLE 11

Sample formulations for Example 5

| Sample | 13 | 14 |
|---|---|---|
| Synthetic B | 152 | 152 |
| ORGANOGEL, g | 3 | 3 |
| LIME, g | 5 | 5 |
| Thixotorl RM-14 | 2 | 2 |
| Emulsifier (actives), g | 6.25 | 6.25 |
| Durogel, g | 4 | 4 |
| Surewet, g | 1 | 1 |
| Ecotrol, HT g | 3 | 3 |
| 25% CaCl2 Brine, g | 65 | 65 |
| M-I Wate, g | 410 | 410 |

TABLE 12

Rheological data for Example 5

| | Sample | | | | | | | |
|---|---|---|---|---|---|---|---|---|
| | 13 Basic Properties | | | | 14 After 3 days static at 350° F. | | | |
| Temperature | 150 F. | 40 F. | 100 F. | 150 F. | 150 F. | 40 F. | 100 F. | 150 F. |
| 600 | 122 | 252 | 145 | 104 | 121 | 244 | 116 | 83 |
| 300 | 77 | 145 | 84 | 62 | 82 | 132 | 59 | 42 |
| 200 | 59 | 105 | 61 | 45 | 65 | 91 | 38 | 26 |
| 100 | 41 | 61 | 37 | 28 | 46 | 47 | 20 | 14 |
| 6 | 14 | 11 | 10 | 11 | 17 | 3 | 2 | 1 |
| 3 | 14 | 8 | 9 | 11 | 16 | 2 | 1 | 1 |
| PV | 45 | 107 | 61 | 42 | 39 | 112 | 57 | 41 |
| YP | 32 | 38 | 23 | 20 | 43 | 20 | 2 | 1 |
| 10" Gels | 13 | 11 | 13 | 18 | 16 | 3 | 1 | 1 |
| 10' Gels | 22 | 34 | 44 | 29 | 23 | 12 | 14 | 16 |
| Electrical Stability | 446 | — | — | 700 | 379 | — | — | 549 |
| HTHP at 350° F. | —+ | — | — | — | — | — | — | 15 |
| Water | — | — | — | trace | — | — | — | 0.1 |

Example 6

An example of polymeric rheology modifier that is efficient at providing rheology modification is a low-molecular weight ionomer poly(ethylene-co-acrylic acid) of general structure (III), where X is in the range of 30 to 60, and y is in the range of 1.5 to 2, available commercially as Aclyn 201A from Honeywell.

(III)

In this example, low molecular weight ethylene/acrylic acid copolymers are assayed for rheological performance before and after a 350° F. hot roll for 48 hours. All examples have the general structure (III), where Sample 16 includes is a calcium salt, Sample 17 is acid, and Sample 18 is a sodium salt. Tables 14 and 15 indicate that all are effective as rheological modifiers.

TABLE 13

Sample formulations for Example 6

| Sample | 15 | 16 | 17 | 18 |
|---|---|---|---|---|
| Compound | No RM | Aclyn 201A | A-C 580 | A-C 285A |
| Synthetic B | 152 | 152 | 152 | 152 |
| Organogel, g | 3 | 3 | 3 | 3 |
| lime, g | 5 | 5 | 5 | 5 |
| Rheology modifier | 0 | 2 | 2 | 2 |
| emulsifier, g | 10.6 | 12.5 | 12.5 | 12.5 |
| Surewet, g | 2 | 2 | 2 | 2 |
| Ecotrol HT, g | 3 | 3 | 3 | 3 |
| 25% CaCl$_2$ | 65 | 65 | 65 | 65 |
| M-I Wate | 410 | 410 | 410 | 410 |

TABLE 14

Rheology data for Example 6

| | 15 | | | | 16 | | | |
|---|---|---|---|---|---|---|---|---|
| | before | after 350° F. hot roll | | | before | after 350° F. hot roll | | |
| RPM | 150° F. | 40° F. | 100° F. | 150° F. | 150° F. | 40° F. | 100° F. | 150° F. |
| 600 | 61 | 172 | 84 | 47 | 62 | 204 | 98 | 63 |
| 300 | 33 | 92 | 43 | 26 | 35 | 116 | 53 | 38 |
| 200 | 24 | 63 | 30 | 17 | 26 | 82 | 39 | 29 |
| 100 | 15 | 34 | 16 | 10 | 18 | 47 | 24 | 21 |
| 6 | 4 | 4 | 3 | 2 | 7 | 10 | 8 | 10 |
| 3 | 4 | 3 | 2 | 2 | 6 | 9 | 8 | 9 |
| PV | 28 | 80 | 41 | 21 | 27 | 88 | 45 | 25 |
| YP | 5 | 12 | 2 | 5 | 8 | 28 | 8 | 13 |
| 10 second gel | 5 | 4 | 3 | 2 | 9 | 14 | 11 | 8 |
| 10 minute gel | 6 | 4 | 3 | 2 | 14 | 33 | 28 | 20 |

TABLE 14-continued

Rheology data for Example 6

| | 15 | | | | 16 | | | |
|---|---|---|---|---|---|---|---|---|
| | before | after 350° F. hot roll | | | before | after 350° F. hot roll | | |
| RPM | 150° F. | 40° F. | 100° F. | 150° F. | 150° F. | 40° F. | 100° F. | 150° F. |
| Electrical Stability | 400 | — | — | 250 | 950 | — | — | 380 |
| HTHP at 350° F. | — | — | — | 14 | — | — | — | 7 |
| water | — | — | — | 0 | — | — | — | trace |

TABLE 15

Rheology data for Example 6

| | Sample | | | | | | | |
|---|---|---|---|---|---|---|---|---|
| | 17 | | | | 18 | | | |
| | before | after 350° F. hot roll | | | before | after 350° F. hot roll | | |
| RPM | 150° F. | 40° F. | 100° F. | 150° F. | 150° F. | 40° F. | 100° F. | 150° F. |
| 600 | 68 | 231 | 101 | 74 | 64 | 202 | 91 | 63 |
| 300 | 41 | 130 | 55 | 43 | 37 | 109 | 47 | 32 |
| 200 | 31 | 94 | 39 | 32 | 29 | 76 | 34 | 24 |
| 100 | 21 | 54 | 24 | 21 | 20 | 43 | 20 | 15 |
| 6 | 7 | 12 | 8 | 8 | 8 | 7 | 5 | 5 |
| 3 | 7 | 10 | 8 | 7 | 7 | 6 | 4 | 4 |
| PV | 27 | 101 | 46 | 31 | 27 | 93 | 44 | 31 |
| YP | 14 | 29 | 9 | 12 | 10 | 16 | 3 | 1 |
| 10 second gel | 9 | 14 | 11 | 7 | 9 | 10 | 6 | 5 |
| 10 minute gel | 14 | 30 | 25 | 16 | 14 | 24 | 20 | 14 |
| Electrical Stability | 950 | — | — | 290 | 500 | — | — | 250 |
| HTHP at 350° F. | — | — | — | 8 | — | — | — | 6.8 |
| water | — | — | — | trace | — | — | — | trace |

Example 7

In the next example, ethylene-acrylic acid co-polymers having various acrylic acid incorporations levels are assayed as polymeric rheology modifiers in accordance with the present disclosure at various degrees of acrylic acid substitution as formulated in Table 16. Sample 19 is a copolymer that incorporates acrylic acid at 5 wt %, having an acid number of 44-47 mg KOH/gram, and a Mettler drop point of 105 degrees. Sample 20 is a copolymer that incorporates acrylic acid at 15 wt %, with an acid number of 112-130 mg KOH/gram. Sample 21 is a copolymer that incorporates acrylic acid at 20 wt %. Rheological data for the samples is presented in Table 17.

TABLE 16

Sample formulations for Example 7

| | Sample | | |
|---|---|---|---|
| | 19 | 20 | 21 |
| | RM | | |
| | poly(ethylene-co-acrylic acid) 5 wt % acrylic acid | poly(ethylene-co-acrylic acid) 15 wt % acrylic acid | poly(ethylene-co-acrylic acid) 20 wt % acrylic acid |
| Synthetic B | 152 | 152 | 152 |
| Organogel, g | 4 | 4 | 4 |
| lime, g | 5 | 5 | 5 |
| Sample RM | 1.5 | 1.5 | 1.5 |
| Emulsifier (actives), g | 6 | 6 | 6 |
| Surewet, g | 1 | 1 | 1 |
| Ecotrol HT, g | 3 | 3 | 3 |
| 25% $CaCl_2$ | 65 | 65 | 65 |
| M-I Wate | 410 | 410 | 410 |

TABLE 17

Rheological data for Example 7

| | Sample | | | | | | | | | | | |
|---|---|---|---|---|---|---|---|---|---|---|---|---|
| | 19 | | | | 20 | | | | 21 | | | |
| | before | after 350° F. hot roll | | | before | after 350° F. hot roll | | | before | after 350° F. hot roll | | |
| RPM | 150° F. | 40° F. | 100° F. | 150° F. | 150° F. | 40° F. | 100° F. | 150° F. | 150° F. | 40° F. | 100° F. | 150° F. |
| 600 | 108 | 300 | 152 | 93 | 114 | 281 | 114 | 7474 | — | 247 | 108 | 71 |
| 300 | 64 | 172 | 84 | 54 | 71 | 156 | 62 | 40 | — | 137 | 58 | 37 |
| 200 | 48 | 123 | 60 | 40 | 57 | 110 | 44 | 29 | — | 97 | 41 | 27 |
| 100 | 30 | 70 | 34 | 26 | 40 | 60 | 25 | 18 | — | 54 | 23 | 16 |
| 6 | 6 | 14 | 9 | 11 | 14 | 7 | 5 | 5 | — | 8 | 4 | 3 |
| 3 | 4 | 11 | 7 | 9 | 12 | 5 | 4 | 4 | — | 6 | 3 | 3 |
| PV | 44 | 128 | 68 | 39 | 43 | 125 | 52 | 34 | — | 110 | 50 | 34 |
| YP | 20 | 44 | 16 | 15 | 28 | 31 | 10 | 6 | — | 27 | 8 | 3 |
| 10 second gel | 4 | 11 | 5 | 9 | 14 | 4 | 4 | 4 | — | 7 | 4 | 3 |
| 10 minute gel | 18 | 70 | 34 | 16 | 29 | 27 | 23 | 19 | — | 15 | 16 | 17 |
| Electrical Stability | 587 | — | — | 769 | 648 | — | — | — | — | — | — | 630 |

Figure 1:
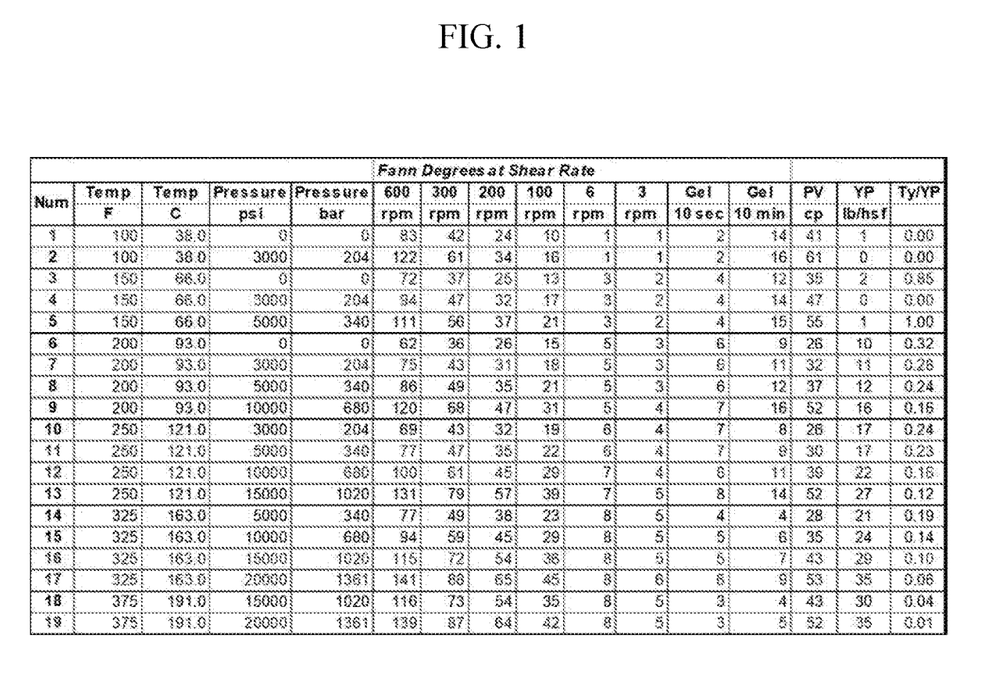
FIGS. 1 and 2 are tabulated data obtained from a Fann 70 high temperature high pressure viscometer for a number of formulations prepared in accordance with embodiments of the present disclosure.
Figure 2:
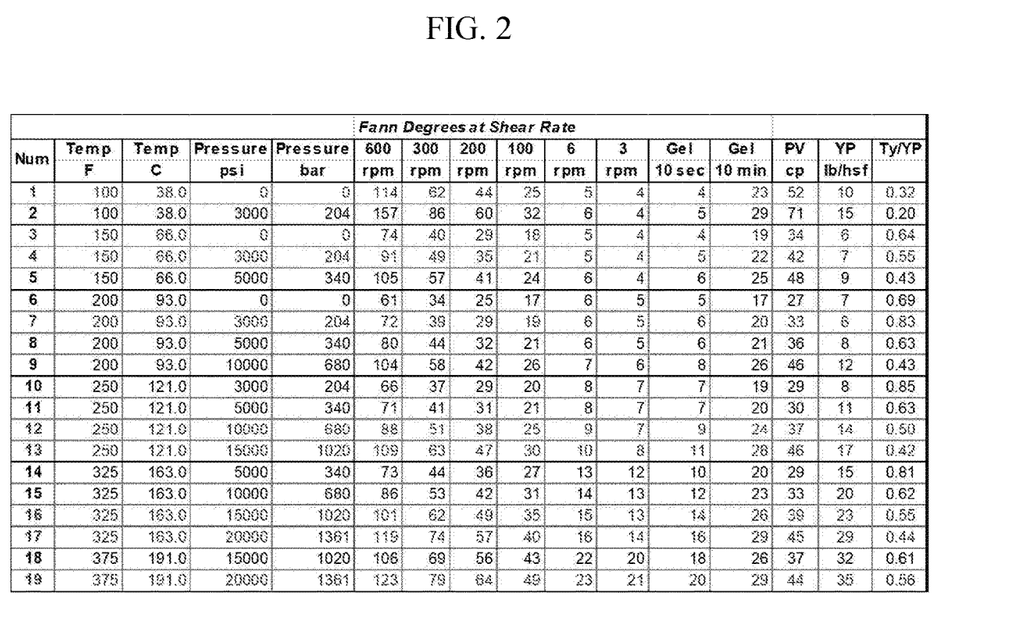

In addition to its function as a rheological modifier, the amount of acrylic comonomer in ethylene-acrylic polymer can have additional benefits to modification of rheology at extreme temperatures. Comparison of Fann 70 rheology data at extreme temperature and pressures, highlights that the ethylene copolymer with 5 wt % of acrylic acid (Sample 19) shown in FIG. 1 exhibits rheological performance at extreme conditions shows some degree of gel breakdown, while the formulation with the ethylene copolymer with 15 wt % acrylic acid (Sample 20) shown in FIG. 2 retains acceptable gel formation.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A wellbore fluid composition, comprising:
   an oleaginous base fluid; and
   a polymeric rheology modifier incorporating a polar comonomer at a percent by weight (wt %) in the range of 1 wt % to 50 wt %;
   wherein the polymeric rheology modifier is present in the wellbore fluid composition at a concentration of 0.5 ppb to 3 ppb;
   wherein the polymeric rheology modifier is poly(ethylene-co-acrylic acid) represented by the structure:

wherein X ranges from 30 to 60 and y ranges from 1.5 to 2; wherein M+ represents a calcium salt.

2. The wellbore fluid composition of claim 1, further comprising: an aqueous internal phase.

3. The wellbore fluid composition of claim 1, wherein the polar comonomer is present at a wt % ranging from 1 wt % to 20 wt %.

4. A method, comprising:
   emplacing the wellbore fluid, according to claim 1, in a wellbore.

5. The method of claim 4, wherein the wellbore fluid further comprises an aqueous internal phase.

6. The method of claim 4, wherein the polar comonomer at a percent by weight in the range of 1 wt % to 20 wt %.

* * * * *